Aug. 29, 1961     C. P. WITTER     2,998,268
TRAILER COUPLINGS
Filed Feb. 13, 1959     4 Sheets-Sheet 1
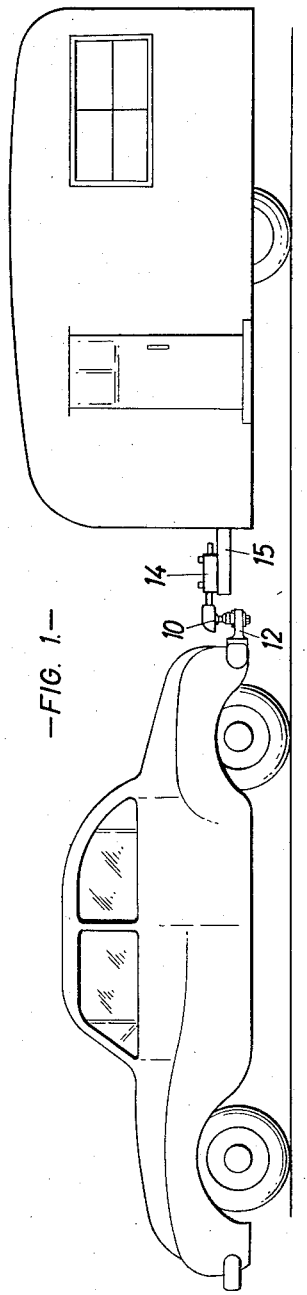
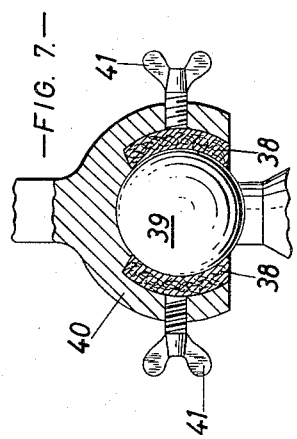
INVENTOR
COLIN P. WITTER
BY
ATTORNEYS

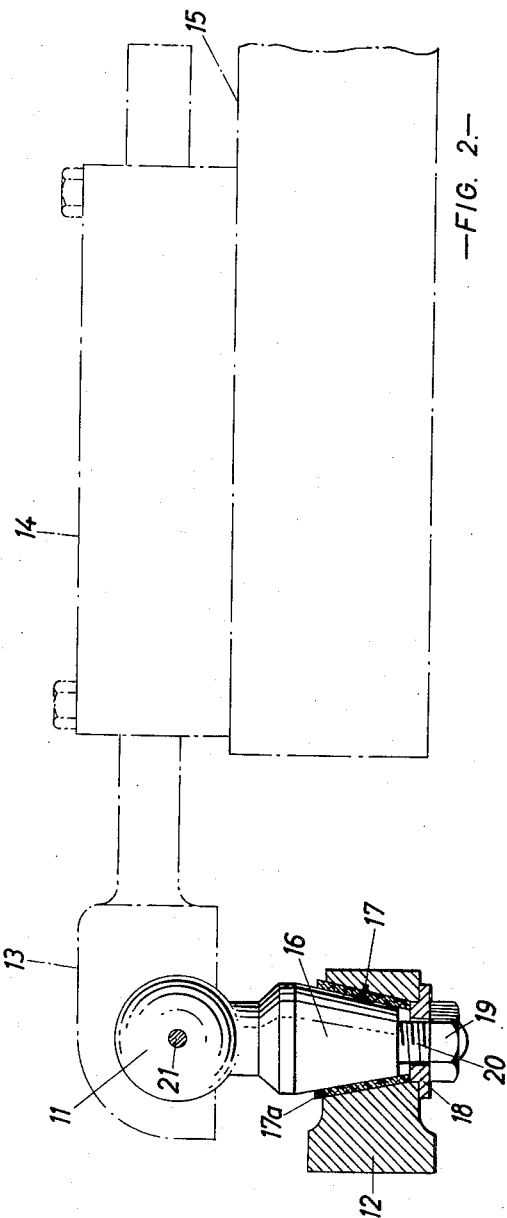

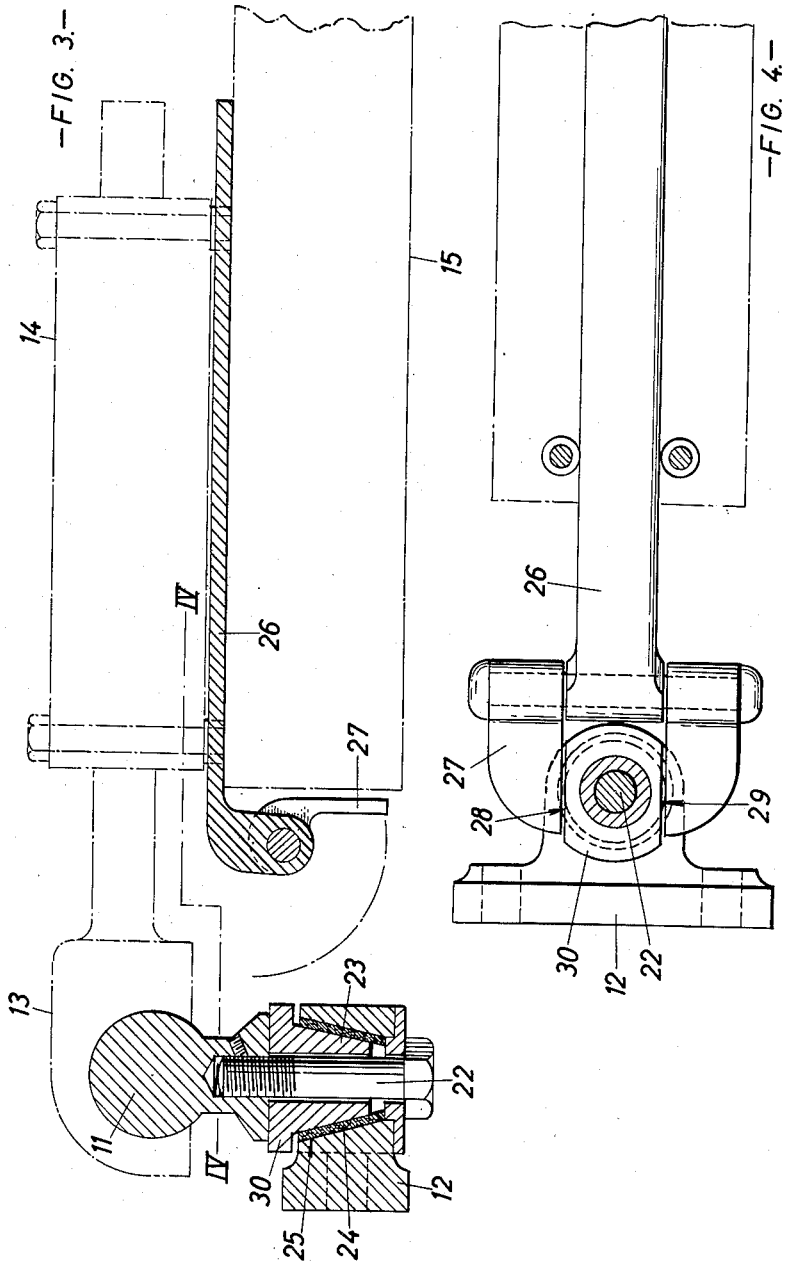

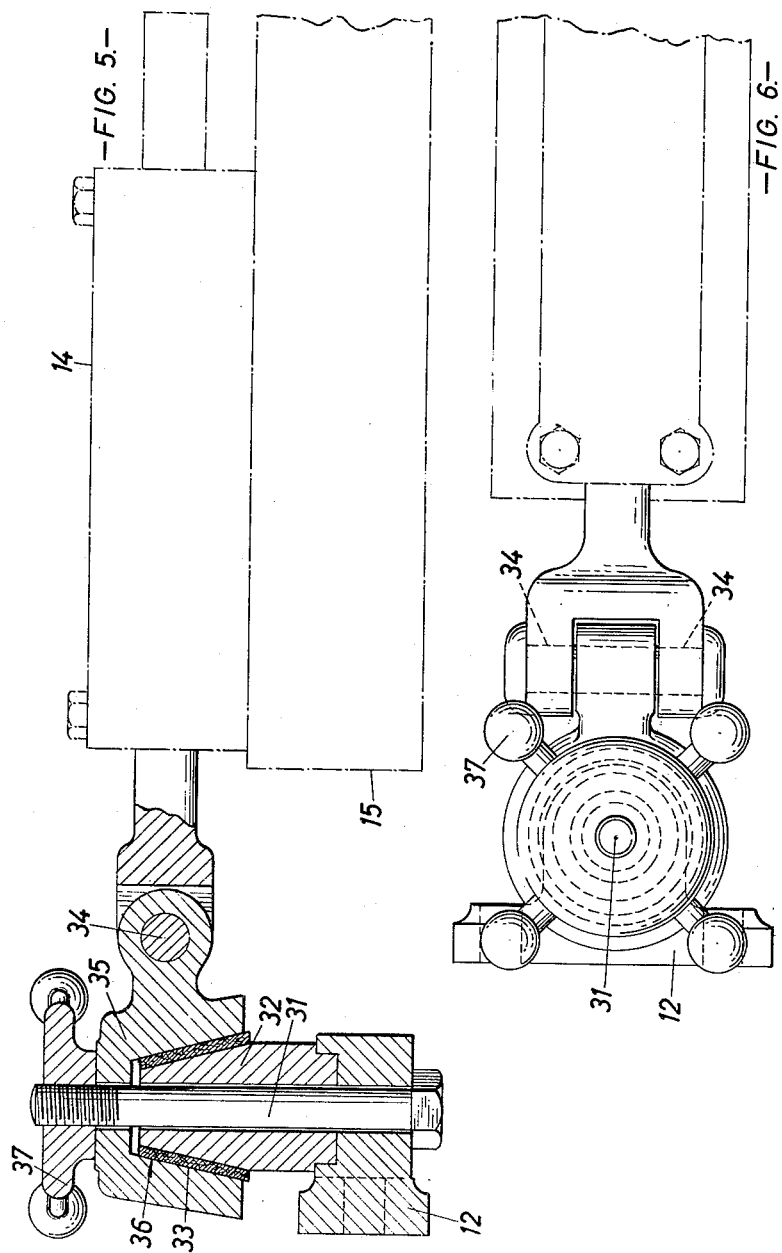

United States Patent Office 2,998,268
Patented Aug. 29, 1961

2,998,268
TRAILER COUPLINGS
Colin Preston Witter, 41 Dee Banks, Chester, England
Filed Feb. 13, 1959, Ser. No. 793,170
Claims priority, application Great Britain Mar. 27, 1958
3 Claims. (Cl. 280—506)

This invention is for improvements in or relating to trailer couplings, i.e. devices for coupling a trailer such as a caravan to, for example, a motor vehicle.

Some trailer vehicles, and particularly poorly designed caravans, have an objectionable tendency to swing or "snake" from side to side. Even with a well designed combination of caravan and towing vehicle, objectionable snaking tends to occur at high or critical speeds or when there are gusty wind conditions.

An object of the present invention is to provide a form of coupling or coupling-accessory which will obviate or reduce this tendency to snaking.

According to the present invention there is provided in or for use with a trailer coupling articulated about a vertical axis, a coupling element or coupling-accessory having a surface of friction material concentric or substantially concentric with said vertical axis and adapted to damp or restrain unwanted lateral movement in the coupling.

The surface of friction material may be embodied in a pivot of the coupling element or it may be on the actual part of one coupling element adapted to mate with a part of the other coupling element so that said friction material is between the two elements of the coupling.

Means may be provided for bringing the damping or stabilizing device in or out of operation as and when desired.

The invention will be further described, by way of example, with reference to the accompanying drawings wherein:

FIGURE 1 is a side view of a motor vehicle having a trailer-caravan coupled to it by a coupling in accordance with the invention, FIGURE 2 is a side elevation partly in section of one form of coupling according to the invention, FIGURE 3 is a side elevation partly in section of a further embodiment of coupling according to the invention, the stabilizing device being shown in its inoperative position, FIGURE 4 is a cross-section on the line IV—IV of FIGURE 3 but with the stabilizing device in its operative position, FIGURE 5 is a sectional side elevation of a still further embodiment of the invention, FIGURE 6 is a plan view of the embodiments shown in FIGURE 5, and FIGURE 7 shows a further embodiment.

The coupling, indicated generally by the reference numeral 10 in FIGURE 1 and shown in detail in FIGURE 2, is of the kind comprising one element in the form of a ball or the like 11, which is secured to a bracket 12 adapted to be attached to the towing bracket on the towing vehicle. The ball or the like 11 is adapted to mate with a female coupling element or cup 13 carried, for example, by a spring box mounting device 14 secured to the trailer drawbar or the like 15.

For the purpose of the present invention the ball 11 has a frusto-conical stem or spigot 16 which fits into a conical socket 17 in the bracket 12, said conical socket having a lining 17a of friction material such as is used for brake linings. The stem or spigot part 16 is held in the socket 17 by a washer 18 and nut 19 screwed onto a threaded extension 20 of the spigot 16. The nut 20 is only tightened sufficiently to ensure that the spigot 16 makes frictional engagement with the lining 17a.

Also for the purpose of the present invention a removable pin 21 is provided which is adapted to pass through registering holes in the ball 11 and female coupling element or cup 13 so as to lock the one to the other and render the ball coupling inoperative as a universal joint.

When an objectionable tendency of the trailer to swing or "snake" from side to side is not to be expected then the stabilizer above described can be rendered inoperative and the ball coupling allowed to operate in the normal way by removing the pin 21. When, however, the vehicle is likely to be driven at such a speed or in such conditions that "snaking" of the trailer from side to side is probable, then the pin 21 is inserted. The articulating members of the coupling are then the spigot 16 and the socket 17 and due to the friction lining of the socket any tendency of the trailer to "snake" is damped or stabilized. The position of the pin 21 through the centre of the ball 11, horizontally and at right-angles to the axis of the trailer, will still allow all the usual articulation required for travelling over uneven ground, hump-backed bridges and the like, and of course the spigot 16 will turn in the friction lining when rounding corners but always under the control or stabilizing action of the friction lining.

FIGURES 3 and 4 also show an embodiment of the invention applied to a trailer coupling of the kind comprising one element in the form of a ball or like 11 which is secured in a bracket 12 by a bolt or screw-threaded stem 22. The ball 11 mates as previously described with a female coupling element or cup 13 carried, for example, by a spring box mounting device 14 adapted to be secured to the trailer drawbar or the like.

The stem or screw 22 of the ball coupling element is fitted with a frusto-conical metal plug 23 provided with a lining or sheath of friction material 24 and adapted to fit into a frusto-conical socket 25 in the bracket 12. The ball coupling element is thus free to move angularly but only under frictional control. The operative connection between this ball coupling element and the trailer, which ensures that any tendency of the trailer to "snake" is resisted or restrained by the frictional device, comprises a member 26 slidably attached to the drawbar or some other convenient part of the trailer and having lugs 27 which, when swung up into a substantially horizontal position, and with the member 26 slid forwardly (see FIGURE 4) embrace two oppositely disposed flats 28 and 29 on a flange or collar 30 on the frusto-conical element. These flats in effect harness the trailer laterally to the frusto-conical plug of the ball coupling element so that any tendency of the trailer to swing from side to side is "braked" or damped by the friction lining of the plug. When it is not desired to use the damping or stabilizing device the member 26 can be retracted so that the lugs 27 swing down into a vertical position clear of the aforementioned flats In a modification of the embodiment of the invention just described a frusto-conical plug of friction material is bonded to the stem 22 of the ball coupling, or otherwise keyed thereto, and replaces the above described frusto-conical metal plug and friction lining.

In some cases, of course, the separate coupling (e.g. the ball coupling) may be dispensed with and the coupling proper and the frictional stabilizer or damper incorporated in one device. Such an arrangement is shown in FIGURES 5 and 6.

Referring to FIGURES 5 and 6 the coupling comprises a bracket 12 adapted to be secured to the rear of a towing vehicle and bored vertically to receive a bolt 31, the shank of which projects above the upper surface of the bracket. Located on the shank of the bolt is an upwardly tapered frusto-conical member 32 which is keyed to the upper surface of the bracket 12. A frusto-conical sheath 33 of friction material, e.g. such as is used for the manufacture of brake linings or clutch linings is positioned over the frusto-conical member 32.

The usual shaft or tow-bar of the trailer or caravan has hinged to its end about a horizontal pivot 34, a female coupling member 35 having a frusto-conical recess 36 in its underface and adapted to be passed over the shank of the bolt 31 so that said frusto-conical recess mates snugly with the friction-lined frusto-conical male member 32 on the towing vehicle bracket. The shank of the bolt passes right up through the pivoted female coupling member on the tow-bar or shaft and is provided at its upper extremity with a securing nut 37. By tightening or slackening the nut 37 the degree of friction or stabilization between the two members or elements of the coupling can be adjusted so as to give the required stabilization or elimination of snaking, whilst at the same time permitting the coupling to operate properly when the vehicle has to negotiate turns or curves.

The female element of the coupling may, of course, be on the towing vehicle and the male element on the trailer.

It will be appreciated that instead of locating or securing the friction material on the frusto-conical spigot member of the towing vehicle bracket it may be located in, or secured in the female frusto-conical recess as a lining thereto. Alternatively both elements of the coupling may carry a friction lining.

The friction lining of the stabilizing device according to the present invention also serves to absorb to a material extent high frequency vibrations between the towing vehicle and the trailer.

In the embodiment of the invention shown in FIGURE 7 friction pads or shoes 38 lined with a friction material are interposed between the male and female coupling elements 39 and 40. Screws 41 or similar devices are provided for adjusting the pressure with which the friction pads or shoes bear on the male element of the coupling.

I claim:

1. In combination with a towing bracket a trailer coupling comprising male and female members fitting and freely articulated one within the other for movement about a vertical axis, means for locking the male coupling element to the female coupling element to restrain said free articulation of the one within the other, means pivotally connecting the male coupling element to said bracket on said vertical axis, and a friction sleeve of brake lining material which is hard and has a high co-efficient of friction located, concentric with said vertical axis, between said male coupling element and the towing bracket to restrain said pivoting of the male coupling member on said bracket about said vertical axis and thereby damp or restrain unwanted lateral pivoting movement in the coupling.

2. In a combination with a towing bracket a trailer coupling comprising male and female members, the male member having a ball part which fits in a spherical seating in the female member so that the coupling members are freely articulated one within the other for movement about a vertical axis, said ball and the female coupling member having registering holes passing through them, a pin in said registering holes to lock the male coupling member to the female coupling member so as to prevent said free articulated movement of the one within the other, said male coupling member also having a tapered spigot part, on said vertical axis, and the towing bracket having a tapered socket which receives said tapered part of the male coupling member, a tapered friction sleeve of brake lining material which is hard and has a high co-efficient of friction on the tapered part of the male coupling member and working against the tapered surface of the socket in the towing bracket, and bolt means on the male coupling member and engaging the towing bracket to draw the tapered part of the male coupling member into the socket of the towing bracket and retain it therein.

3. In a combination with a towing bracket and trailer drawbar a trailer coupling comprising male and female members, the male member having a ball part which fits in a spherical seating in the female member so that the coupling members are freely articulated one within the other for movement about a vertical axis, the male coupling member also having a tapered spigot part on said vertical axis and the towing bracket having a tapered socket which receives said tapered part of the male coupling member, a tapered friction sleeve of brake lining material which is hard and has a high co-efficient of friction on the tapered part of the male coupling and working against the tapered surface of the socket in the towing bracket, and bolt means on the male coupling member and engaging the towing bracket to draw the tapered part of the male coupling member into the socket of the towing bracket and retain it therein, the male coupling part having a "flat" and the trailer drawbar including a member operative to engage said "flat" and become locked to the male coupling member.

References Cited in the file of this patent

UNITED STATES PATENTS

| | | |
|---|---|---|
| 2,125,479 | Zagelmeyer | Aug. 2, 1938 |
| 2,127,913 | Graham et al. | Aug. 23, 1938 |
| 2,516,555 | Dear | July 25, 1950 |
| 2,549,178 | Dear | Apr. 17, 1951 |
| 2,614,861 | Van Horn | Oct. 21, 1952 |

FOREIGN PATENTS

| | | |
|---|---|---|
| 10,326 | Germany | Aug. 16, 1956 |
| 164,457 | Sweden | Aug. 26, 1958 |